(12) United States Patent
Hopkins

(10) Patent No.: US 10,665,405 B2
(45) Date of Patent: *May 26, 2020

(54) PROTECTIVE CIRCUIT FOR AN APPARATUS

(71) Applicant: STMicroelectronics, Inc., Coppell, TX (US)

(72) Inventor: Thomas L. Hopkins, Mundelein, IL (US)

(73) Assignee: STMicroelectronics, Inc., Coppell, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/866,552

(22) Filed: Jan. 10, 2018

(65) Prior Publication Data

US 2018/0130623 A1    May 10, 2018

Related U.S. Application Data

(63) Continuation of application No. 15/044,762, filed on Feb. 16, 2016, now Pat. No. 9,899,170, which is a continuation of application No. 12/331,364, filed on Dec. 9, 2008, now abandoned.

(51) Int. Cl.
| | |
|---|---|
| *H02H 11/00* | (2006.01) |
| *H01H 35/02* | (2006.01) |
| *D06F 75/26* | (2006.01) |
| *G05B 9/02* | (2006.01) |
| *H01H 35/14* | (2006.01) |

(52) U.S. Cl.
CPC ............ *H01H 35/02* (2013.01); *D06F 75/26* (2013.01); *G05B 9/02* (2013.01); *H01H 35/14* (2013.01); *H01H 2231/012* (2013.01)

(58) Field of Classification Search
USPC ........................................................ 307/326
See application file for complete search history.

(56) References Cited

U.S. PATENT DOCUMENTS

| | | | |
|---|---|---|---|
| 4,130,955 A | 12/1978 | Baumgartner et al. | |
| 4,203,101 A | 5/1980 | Towsend | |
| 5,805,767 A | 9/1998 | Jouas et al. | |
| 6,059,576 A * | 5/2000 | Brann ................... | A61B 5/1116 434/247 |
| 2002/0032366 A1 | 3/2002 | Iddan et al. | |
| 2002/0118121 A1 | 8/2002 | Lehrman et al. | |
| 2006/0043181 A1 | 3/2006 | Naito et al. | |
| 2006/0081771 A1 | 4/2006 | Eliad Wardimon | |

(Continued)

FOREIGN PATENT DOCUMENTS

| | | |
|---|---|---|
| JP | 405184799 | 7/1993 |
| WO | WO-2005014917 A1 | 2/2005 |

*Primary Examiner* — Rexford N Barnie
*Assistant Examiner* — Dru Parries
(74) *Attorney, Agent, or Firm* — Crowe & Dunlevy

(57) ABSTRACT

A protective circuit for an apparatus includes an accelerometer having an output and a microcontroller coupled to the output of the accelerometer. The protective circuit also includes a switch for controlling the apparatus coupled to an output of the microcontroller and a load coupled to the switch. A power source is coupled to the load and the switch. In operation the microcontroller is cable of sending a signal to the switch to turn of power to the load when a dangerous condition as detected from the accelerometer data has occurred.

12 Claims, 5 Drawing Sheets

(56) References Cited

U.S. PATENT DOCUMENTS

2006/0152842 A1 7/2006 Pasolini et al.
2007/0030587 A1 2/2007 Noda et al.
2007/0156364 A1 7/2007 Rothkopf

* cited by examiner

PROTECTIVE CIRCUIT FOR AN APPARATUS

CROSS-REFERENCE TO RELATED APPLICATION

This application is a continuation of U.S. application patent Ser. No. 15/044,762, filed Feb. 16, 2016, which is a continuation of U.S. application patent Ser. No. 12/331,364, filed Dec. 9, 2008, now abandoned, the disclosure of which is incorporated by reference.

TECHNICAL FIELD

The invention relates, in general, to a protection circuit that is capable of disabling an apparatus after sensing a predetermined condition. More particularly, the protection circuit may be used in appliances that are capable of generating a dangerous condition.

BACKGROUND

Consumer appliances can be dangerous when left unattended. For example, the heat generated by an electric iron that is left on and unattended can damage the surface on which it is resting or potentially cause a fire. Other consumer appliances such as curling irons, soldering irons, electric heaters, and the like may also be dangerous if left on in an unattended state, exceedingly more so if oriented in certain positions, e.g., arranged on a heating surface for an electric iron. Accordingly, in the related art, different types of protection circuits have been developed to address these problems. These circuits disable or turn off the appliance if it is not being used and/or is sitting in a potentially hazardous position.

Typical related art methods use a mechanically operated switch driven by gravity or some other acceleration. One type of switch includes a metal ball that is free to roll on a track and comes to rest on a set of electrical contacts at certain angles or under certain accelerations. This type of switch is problematic as it can lose its reliability over time. For example, the mechanical aspects of the switch may corrode over time. In addition, the number of potentially dangerous conditions for which these switches provide useful prevention is narrow due to the mechanical limitations of the switch. The mechanical switch design typically requires a large angle of rotation for the metal ball to move and make contact with the electrical contacts.

Another related method is taught by U.S. Pat. No. 4,203,101, incorporated by reference, which discloses an electric iron having a sensor in the handle that is sensitive to the pressure of an operator's hand. These types of sensors are also limited in their applicability as a user may not want the apparatus to turn off even if the sensor is not triggered.

SUMMARY OF THE INVENTION

Accordingly, the invention is directed to a protective circuit for an apparatus that substantially obviates one or more of the problems due to limitations and disadvantages of the related art.

An advantage of the invention is to provide a low cost, accurate protective circuit for use in a wide variety of apparatuses.

Another advantage of the invention is to provide a protective circuit that is capable of turning off an apparatus if left in an unattended state for a predetermined period of time or if left in a hazardous orientation also for a predetermined period of time.

Additional features and advantages of the invention will be set forth in the description which follows and in part will be apparent from the description or may be learned by practice of the invention. The features of the invention will be realized and attained by the structure particularly pointed out in the written description and claims hereof as well as the appended drawings.

To achieve these and other advantages and in accordance with the purpose of the invention, as embodied and broadly described, the invention is directed towards a protective circuit for an apparatus including an accelerometer having an output and a microcontroller coupled to the output of the accelerometer. The protective circuit also includes a switch for controlling the apparatus coupled to an output of the microcontroller and a load coupled to the switch. A power source is coupled to the load and the switch. In operation the microcontroller is capable of sending a signal to the switch to turn off power to the load when a dangerous condition has occurred.

In another aspect of the invention, a protective circuit for an appliance includes a two-axis micro electro-mechanical systems (MEMS) accelerometer having a first axis in a y-direction and a second axis in an x-direction. The protective circuit also includes a microcontroller coupled to an output of the two-axis MEMS accelerometer and a switch to turn on or off the small appliance coupled to an output of the microcontroller. The microcontroller is configured to turn off the switch when the appliance is in a predetermined orientation for a predetermined period of time. The protective circuit also includes a load coupled to the switch and a power source coupled to the load and the switch.

In yet another aspect of the invention, a method of controlling an apparatus with a protective circuit of the invention includes performing a periodic interrupt on a microcontroller. In a next step, values are read from a MEMS accelerometer, wherein the values include a first gravitational measurement in a first direction and a second gravitational measurement in a second direction being substantially perpendicular to the first direction. In a subsequent step, the first and second gravitational values are compared with a previous first and second gravitational value and a no motion counter is incremented when the first and second gravitational values are within a first predetermined range of a previously read first and second gravitational values. In addition, the no motion counter is reset to zero when the first and second gravitational values are within a second predetermined range of the previous first and second gravitational values when comparing the no motion counter to a predetermined first maximum no motion count. Moreover, the first and second gravitational values are compared with predetermined first and second gravitational values when the no motion counter is greater than the maximum no motion counter. A signal is sent to turn off load to an apparatus when the no motion counter is above the first predetermined maximum no motion count the first and second gravitational values are within a predetermined tolerance of the predetermined first and second gravitational values. Moreover, a return command is sent to the microcontroller when the first and second gravitational values are not within a predetermined tolerance of the predetermined first and second gravitational values.

It is to be understood that both the foregoing general description and the following detailed description are exemplary and explanatory and are intended to provide further explanation of the invention as claimed.

In an embodiment, a method of controlling an apparatus comprises the steps of: a) periodically reading a gravitational value generated by an accelerometer; b) comparing the gravitational value with a previous gravitational value; c) incrementing a no motion counter when the gravitational value is substantially the same as the previous gravitational value; d) resetting the no motion counter to zero when the gravitational value is substantially different from the previous gravitational value; e) determining if the no motion counter exceeds a threshold; f) if yes in e), determining whether the gravitational value is within a tolerance difference from a reference gravitational value that is indicative of a known dangerous orientation; and g) if yes in f), sending a signal to turn off power delivery to a load of the apparatus.

In an embodiment, a protective circuit for an apparatus comprises: an accelerometer having an output; a microcontroller coupled to the output of the accelerometer; a switch configured to control delivery of power to the apparatus, said switch coupled to an output of the microcontroller; a load of the apparatus coupled to a first terminal of the switch, wherein a second terminal of the switch is configured to be coupled to a power source; wherein the microcontroller is configured to: a) receive from the accelerometer a gravitational value; b) compare the gravitational value with a previous gravitational value; c) increment a no motion counter when the gravitational value is substantially the same as the previous gravitational value; d) reset the no motion counter to zero when the gravitational value is substantially different from the previous gravitational value; e) determine if the no motion counter exceeds a threshold; f) if yes in e), determine whether the gravitational value is within a tolerance difference from a reference gravitational value that is indicative of a known dangerous orientation; and g) if yes in f), control the switch to turn off power delivery to the load.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
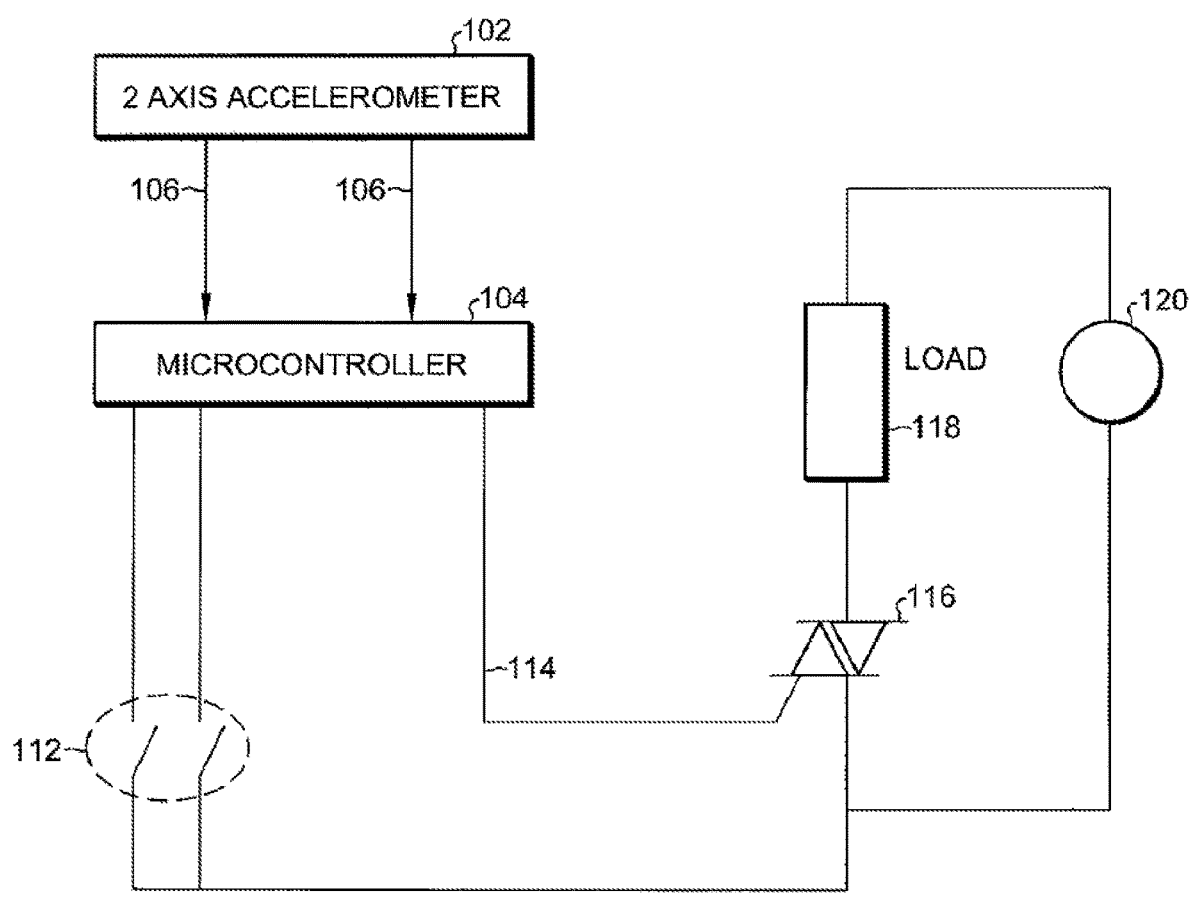
FIG. 1 illustrates a block diagram of a protective circuit in accordance with an embodiment of the invention.

The invention relates, in general, to a protection circuit that is capable of disabling an apparatus after sensing a predetermined condition. More particularly, the protection circuit may be used in appliances that are dangerous if left unattended especially if oriented in certain positions.

One embodiment of the invention is directed towards a protective circuit for an apparatus. The apparatus may be any apparatus capable of implementing the protective circuit. For example, the apparatus may be an electric iron, soldering iron, hair dryer, electric heater and the like. The protective circuit includes an accelerometer having an output and a microcontroller coupled to the output of the accelerometer. A switch to control a power source is coupled to an output of the microcontroller and a load of the apparatus. The switch is capable of being activated by a signal output from the microcontroller. When utilizing an alternating current (AC) power source the switch may be a triac. Alternatively, when utilizing a direct current (DC) power source the switch may be a field effect transistor (FET). Of course, other switches as known in the art may also be utilized.

In a preferred embodiment, the microcontroller is configured to output a control signal to turn off the switch when it receives output values from the accelerometer that are substantially equal to predetermined values after a predetermined time period. The predetermined values correspond to a potentially dangerous orientation of the apparatus. The predetermined time period is chosen based on the hazard of leaving an apparatus in a potentially dangerous orientation for a period of time. For example, the predetermined time period for an apparatus left unattended on its heating surface may be less than that for the apparatus left unattended on its heel, e.g., 5 minutes and 10 minutes, respectively.

The accelerometer may include any axis accelerometer, e.g., a four-axis accelerometer, three-axis accelerometer, two-axis accelerometer, and one-axis accelerometer. In a preferred embodiment, a two-axis accelerometer is utilized in the apparatus. The accelerometer may include any axis MEMS accelerometer as known in the art. In a preferred embodiment, a two-axis MEMS accelerometer is used having an orientation axes generally at right angles to each other. The MEMS accelerometer operates in-plane and is designed to be sensitive only to a direction in the plane of the die. Accelerometers may be either digital or analog. In a preferred embodiment, the accelerometers are digital accelerometers. When utilizing an analog accelerometer the device may be using an internal analog to digital (A/D) converter in the microcontroller. An additional axis may be added, e.g., adding an additional out-of-plane axis, thereby forming a 3-axis accelerometer.

MEMS accelerometers are available in a wide variety of measuring ranges, reaching up to thousands of Gs. The designer optimizes the apparatus by compromising between sensitivity and the maximal acceleration that can be measured. Some example MEMS accelerometers include STMicroelectronics LIS302DL MEMS motion sensor, the data sheet of which is incorporated by reference for all purposes as if fully set forth herein; STMicroelectronics LIS202DL MEMS motion sensor, the data sheet of which is hereby incorporated by reference for all purposes as if fully set forth herein; STMicroelectronics LIS331DL MEMS motion sensor, the data sheet of which is hereby incorporated by reference for all purposes as if fully set forth herein; STMicroelectronics LIS244AL MEMS motion sensor, the data sheet of which is hereby incorporated by reference for all purposes as if fully set forth herein; and STMicroelectronics LIS244ALH MEMS motion sensor, the data sheet of which is hereby incorporated by reference for all purposes as if fully set forth herein. Of course other accelerometers as known in the art may also be used, such as, laser accelerometers and the like.

The microcontroller may be any conventional microcontroller. For example, the microcontroller may include 8 bit architecture, 16 bit architecture or higher architectures. In a preferred embodiment, a low cost microcontroller is utilized, such as, STMicroelectronics 8-bit ST7LITE39 microcontroller; the data sheet for ST7LITE39 is hereby incorporated by reference as if fully set forth herein.

Reference will now be made in detail to other embodiments of the invention, examples of which are illustrated in the accompanying drawings.

FIG. 1 illustrates a block diagram of a protection circuit in an apparatus according to one aspect of the invention. Referring to FIG. 1, the protection circuit is generally depicted as reference number 100. The protection circuit includes a two-axis MEMS accelerometer 102 coupled to a microcontroller 104. Output signals 106 from the MEMS accelerometer 102 are input into the microcontroller 104. The output signals 106 are described with more specificity in FIGS. 3A-3E below. Switches 112 provide inputs to microcontroller 104 that may be used to turn the appliance on or off or to select various settings. The microcontroller 104 has an output signal 114 coupled to a switch 116.

The output signal 114 controls the state of the switch 116, e.g., on or off. The switch 116 is coupled to a load 118 and power source 120. In a preferred embodiment the power source is an alternating current (AC) power source and the switch 116 is a Triac. However, in an alternative embodiment the power source may be a direct current (DC) power source and switch 116 may be a field effect transistor (FET). The microcontroller 104 can act to turn the device off if the appliance is in an unsafe orientation and/or left unattended for a predetermined period of time.

Figures 2A, 2B:
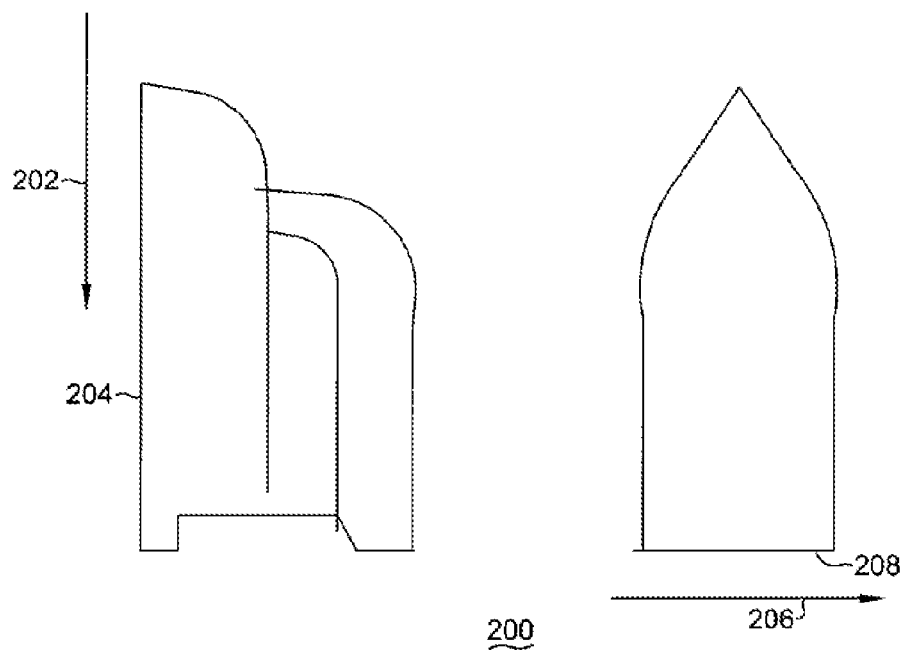
FIGS. 2A and 2B illustrate an electric iron implementing a protective circuit in accordance with another embodiment of the invention.

FIG. 2A illustrates a side view of an electric iron implementing a protective circuit in accordance with another embodiment of the invention. FIG. 2B illustrates a face view of an electric iron implementing a protective circuit in accordance with another embodiment of the invention. Referring to FIGS. 2A and 2B, the electric iron apparatus is generally depicted as reference number 200 and includes a protective circuit 100 to turn off the iron 200 after a predetermined condition for a predetermined amount of time. The protective circuit includes a two-axis MEMS accelerometer as shown in FIG. 1. The two-axis accelerometer is oriented in the apparatus 200 such that the first axis of measurement 202 is in the y-direction and is substantially parallel to a heating surface of the iron. The second axis of measurement 206 is in the x-direction and is oriented substantially parallel to the heating surface of the iron and is also oriented to be substantially perpendicular to the first axis of measurement 202.

Figure 3A:
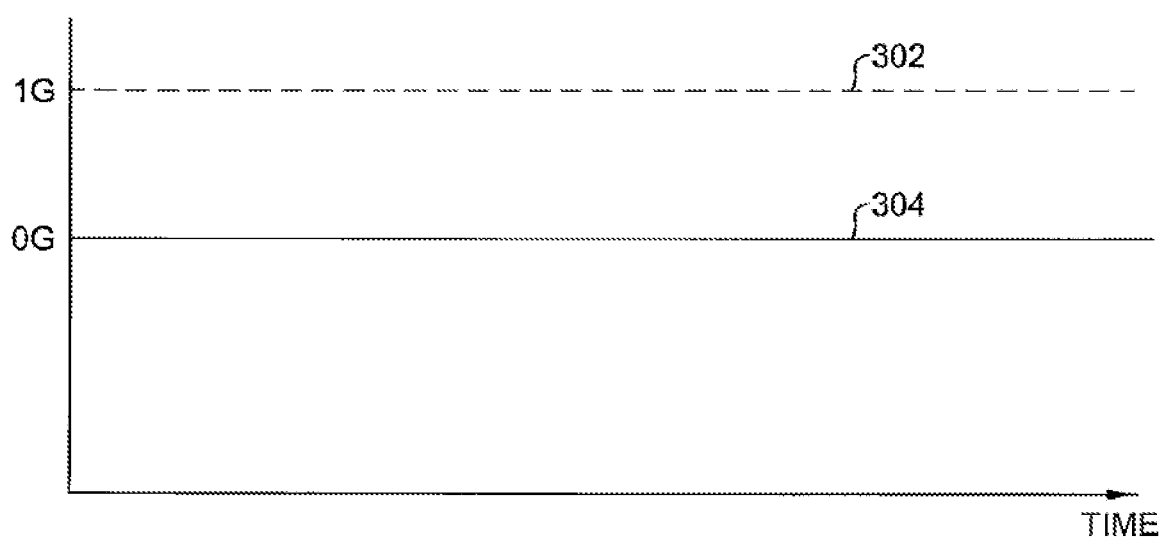
FIG. 3A illustrates a theoretical output of a two-axis MEMS accelerometer in an electric iron positioned stationary upright on its heel.

FIG. 3A illustrates a theoretical output of a two-axis MEMS accelerometer in an electric iron positioned stationary upright on the iron's heel. Referring to FIG. 3A, a graph includes a y-axis measuring the average acceleration produced by gravity at the Earth's surface (g) and an x-axis measuring time (ms). The graph represents a theoretical output of a two-axis MEMS accelerometer positioned as described with reference to FIG. 2. By way of example, if the iron is at rest on its heel with its heating surface 204 perpendicular to the gravitational field, an output 302 of the first axis of measurement 202 is shown at about 1 G. Moreover, an output 304 of the second axis of measurement 206 is shown at about 0 G.

Figure 3B:
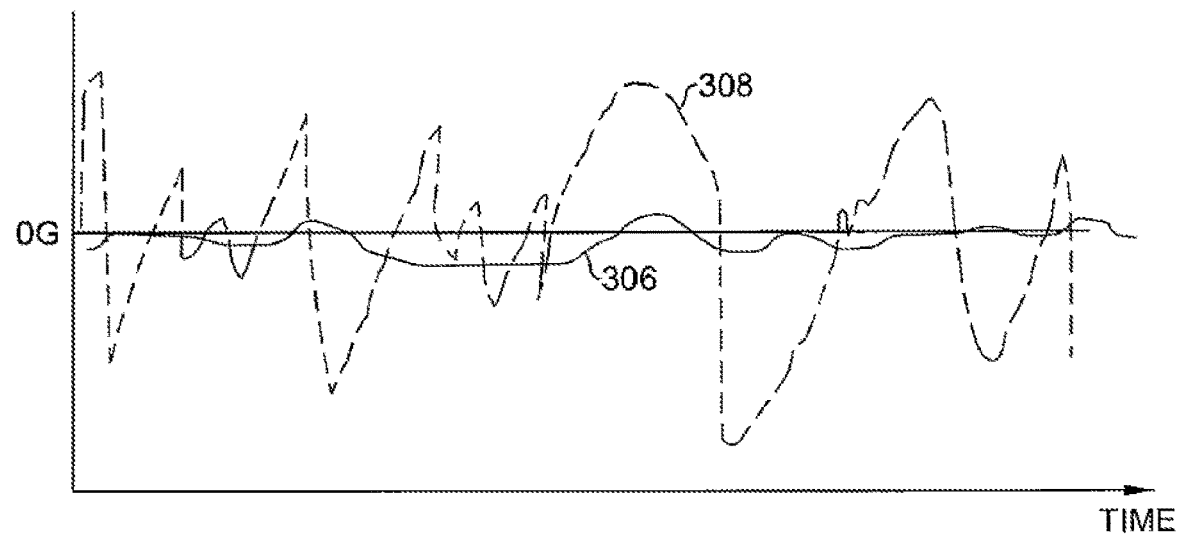
FIG. 3B illustrates a theoretical output of a two-axis MEMS accelerometer in an electric iron when moving the iron in a front to back motion primarily along an axis parallel to the face of the iron and substantially parallel to a line running from toe to heel of the iron.
Figure 3C:
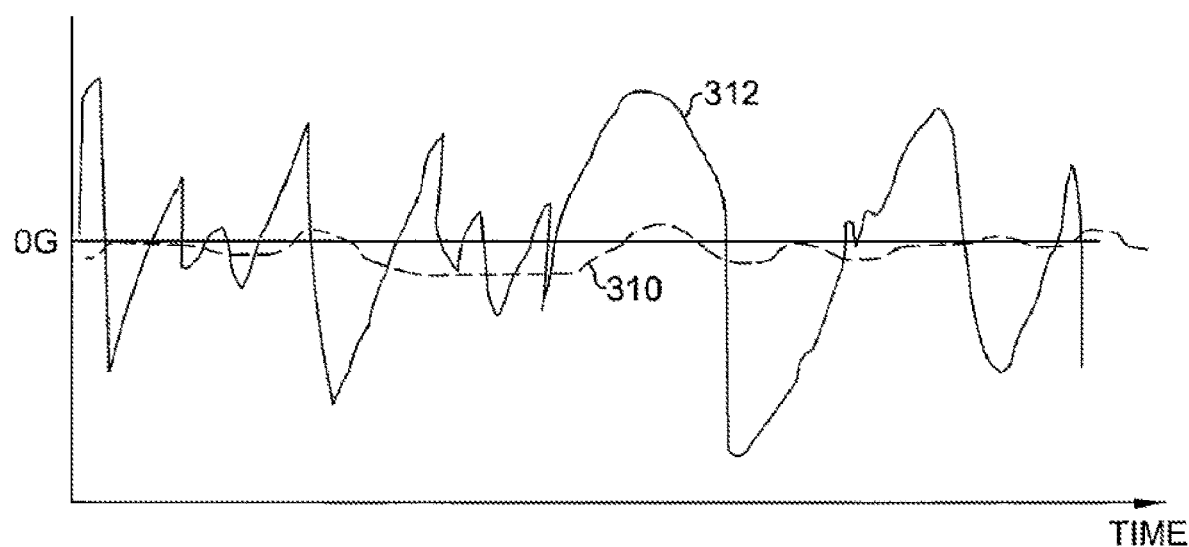
FIG. 3C illustrates a theoretical output of a two-axis MEMS accelerometer in an electric iron when moving the iron in a side to side motion primarily along the axis substantially parallel to the face of the iron and substantially perpendicular to a line running from toe to heel of the apparatus.

FIG. 3B illustrates a theoretical output of a two-axis MEMS accelerometer in an electric iron when moving the iron in a front to back motion primarily along an axis parallel to the face of the iron and substantially parallel to a line running from toe to heel of the iron. FIG. 3C illustrates a theoretical output of a two-axis MEMS accelerometer in an electric iron when moving the iron in a side to side motion primarily along the axis substantially parallel to the face of the iron and substantially perpendicular to a line running from toe to heel of the apparatus.

Referring now to FIG. 3B, the graph represents the theoretical output of a two-axis MEMS accelerometer. Accelerations of the two-axis MEMS accelerometer are theoretically measured as the iron is moved in a back and forth motion. As shown, an output 306 of the second axis of measurement 206 is shown at about 0 G. The output 308 measuring the gravitational field on the first axis of measurement 202 corresponds to movement of the iron. As shown, as the iron theoretically moves back and forth so does the output signal 308 while the output signal 306 remains relatively static.

Referring now to FIG. 3C, the graph represents the theoretical output of a two-axis MEMS accelerometer. Accelerations of the two-axis accelerometer are theoretically measured as the iron is moved in a side to side motion. As shown, an output 310 measuring the gravitational field on the first axis of measurement 202 is shown at about 0 G. The output 312 measuring the gravitational field on the second axis of measurement 206 corresponds to movement of the iron. As shown, as the iron theoretically moves side to side so does the output signal 312 while the output signal 310 remains relatively static.

Figure 3D:
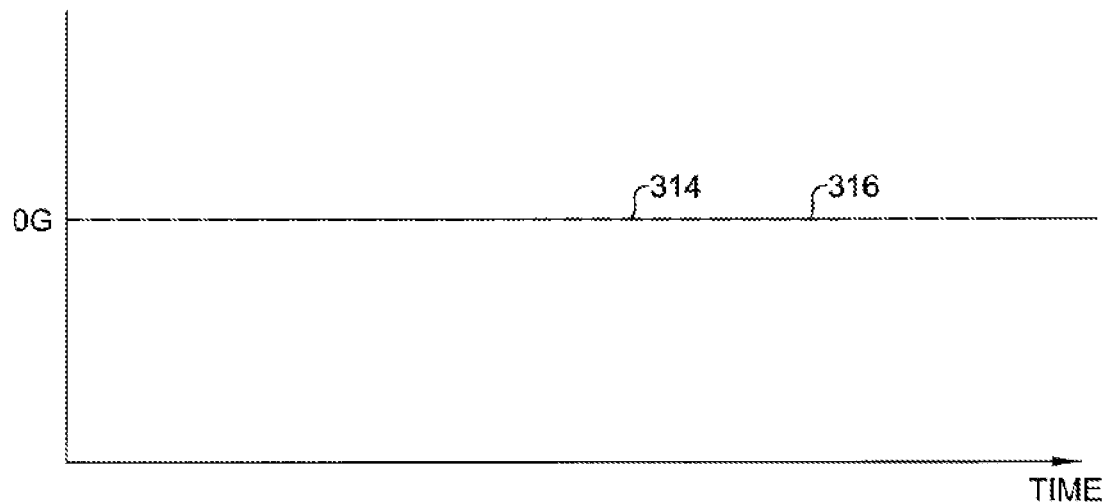
FIG. 3D illustrates a theoretical output of a two-axis MEMS accelerometer in an electric iron positioned stationary on its heating surface.

FIG. 3D illustrates a theoretical output of a two-axis MEMS accelerometer in an electric iron positioned stationary on its heating surface. Referring now to FIG. 3D, the graph represents the theoretical output of a two-axis MEMS accelerometer. Accelerations of the two-axis accelerometer are theoretically measured as the iron is laying stationary on its heating surface. As shown, an output 314 measuring the gravitational field on the first axis of measurement 202 is shown at about 0 G. The output 316 measuring the gravitational field on the second axis of measurement 206 is also at about 0 G.

Figure 3E:
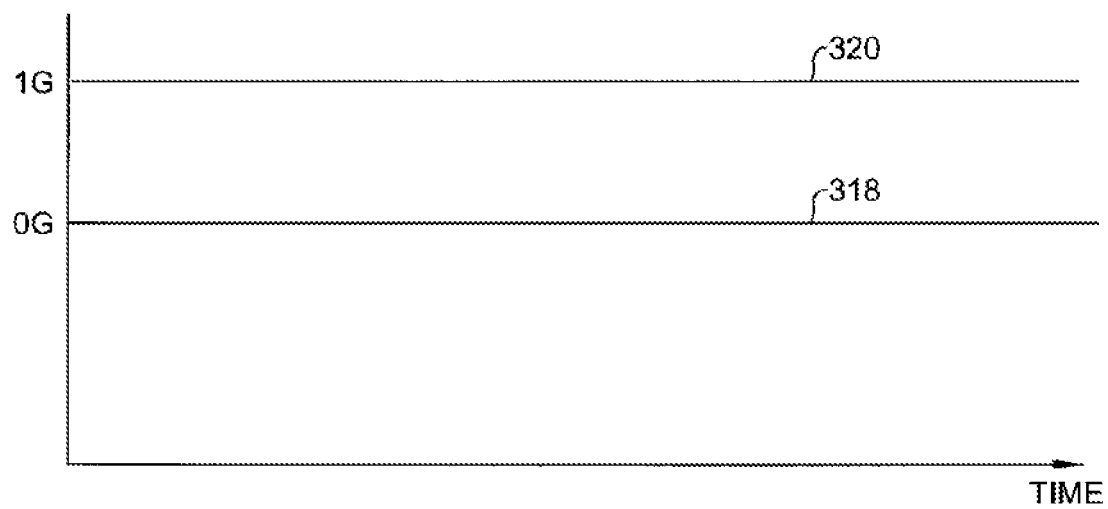
FIG. 3E illustrates a theoretical output of a two-axis MEMS accelerometer in an electric iron positioned stationary laying on its side having the heating surface of the iron apparatus substantially perpendicular to the axis of gravity.

FIG. 3E illustrates a theoretical output of a two-axis MEMS accelerometer in an electric iron positioned stationary laying on its side having the heating surface of the iron apparatus substantially perpendicular to the axis of gravity. The graph represents the theoretical output of a two-axis MEMS accelerometer. An output 318 measuring the gravitational field on the first axis of measurement 202 is shown at about 0 G. Also, an output 320 measuring the gravitational field on the second axis of measurement 206 has a value of about 1 G.

Figure 4:
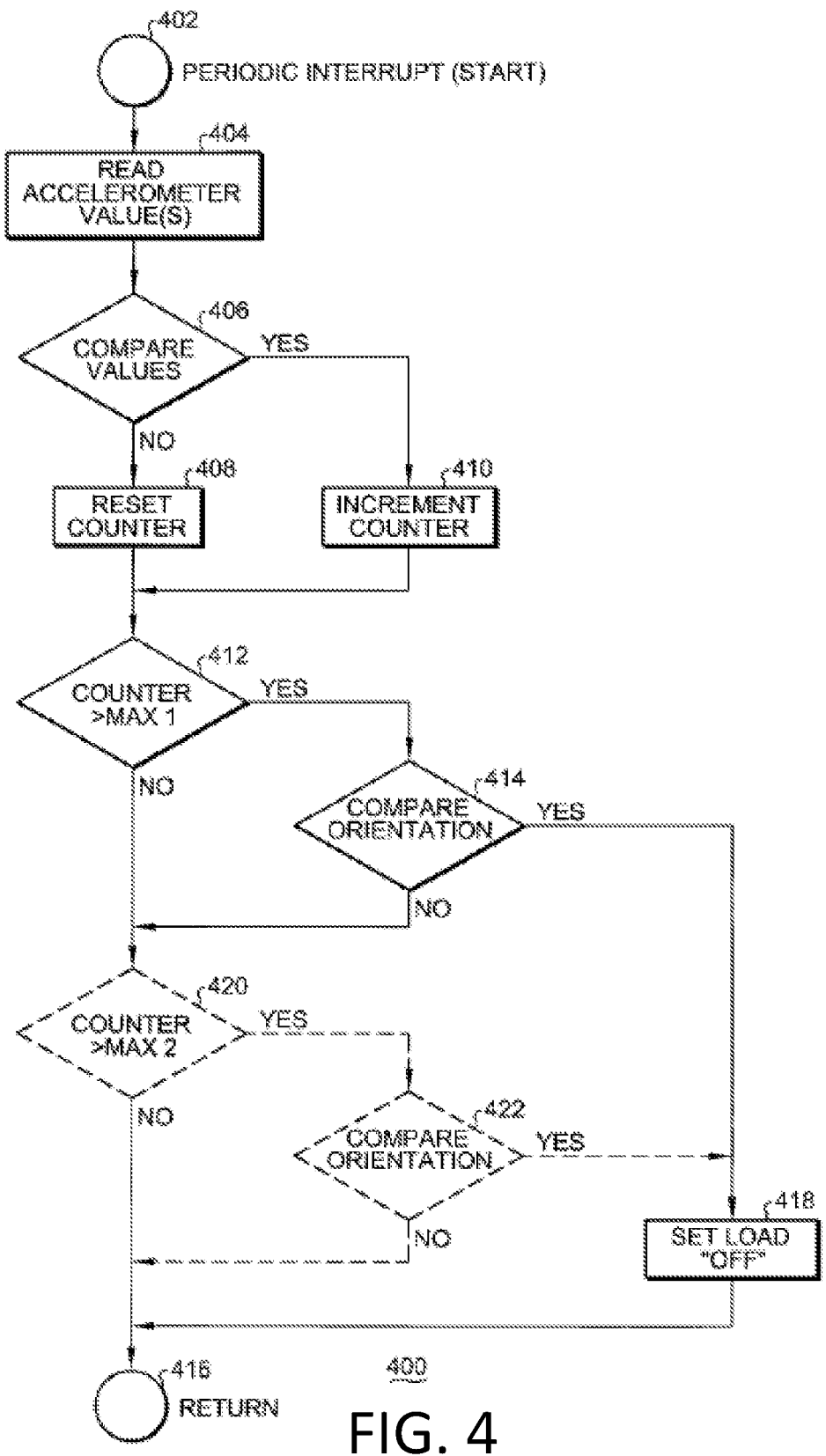
FIG. 4 is a flowchart illustrating functionality of a microcontroller according to another embodiment of the invention.

FIG. 4 is a flowchart illustrating functionality of a microcontroller according to another embodiment of the invention.

Referring to FIG. 4, a flowchart depicts functionality of a microcontroller in accordance with an embodiment of the invention. The flowchart is generally depicted as reference number 400. The flowchart 400 is a graphical illustration of the functionality of the microcontroller. Step 402 provides a periodic interrupt to execute functionality of the microcontroller as depicted in the flowchart 400. The periodic interrupt can be configured to occur in accordance with the characteristics of the microcontroller as would be known to one of ordinary skill in the art. For example, depending on the architecture of the microcontroller, i.e., 8 bit, 16 bit, a suitable time for the periodic cycle may be chosen. In one embodiment, the periodic interrupt is set to 30 ms. In step 404 output values of the accelerometer are read. This reading may include multiple readings and averaging the average values to filter noise as known in the art. Moreover, the reading may also include debounce logic as known in the art. These additional techniques (averaging, filter, debounce logic) are instituted to remove unwanted noise; of course other conventional techniques may also be utilized.

Step 406 compares the read values with previously read values to determine if they are approximately equal. In one embodiment, a tolerance ranging from about 5 percent to about 10 percent or higher is utilized in order to eliminate noise. Other tolerances may be used to maximize the accuracy of the comparison, thereby eliminating noise. If the values are substantially equal then step 408 is performed. If the values are not substantially equal then step 410 is performed. In a two-axis MEMS accelerometer the values include a gravitational measurement in an x-direction and a gravitational measurement in a y-direction. In a three-axis MEMS accelerometer the values would also include a gravitational measurement in a z-direction.

In step 408, the previously read values and the currently read values are not substantially equal, thereby indicating the apparatus has been moved or is in some form of motion as compared to the time the previously read values were read. In this step, the no motion counter is reset indicating there has been motion of the apparatus. In step 410, the previously read values and the currently read values are substantially equal. In this step, the no motion counter is incremented thereby indicating there has been no motion of the apparatus from the time the previously read values were read.

Next in step 412, the no motion counter is compared to a predetermined maximum count (max 1). If the no motion counter is greater than max 1 then step 414 is executed. If the no motion counter is less than or equal to max 1 then a return 416 is executed. In step 414, an orientation of the apparatus is determined by comparing predetermined orientation values with measured values of step 404. In this embodiment, the predetermined orientation values correspond to an orientation shown in FIG. 3D. That is, an orientation where the apparatus is resting on a heating surface. This may also be referred to as a predetermined condition. As shown with reference to FIG. 3D, a first output of a two-axis MEMS accelerometer measuring the gravitational field on the first axis of measurement 202 has a value of about 0 G. A second output measuring the gravitational field on the second axis of measurement 206 has a value of about 0 G. In this comparison step 414, the values of step 404 are compared to determine if they are approximately equal to the predetermined condition representing a predetermined orientation. If the values 404 are approximately equal to the values of the predetermined values then step 418 is executed. If the values are not approximately equal to predetermined values then step 416 is executed. It is noted that an error tolerance may be used to account for noise, for example, a tolerance ranging from about 1 percent to 5 percent or higher. In step 418, the microcontroller sends an off signal to turn off a switch thereby disabling power to a load on the apparatus. By way of example and referring to FIG. 1, an off signal 114 is sent to switch 116 to turn off power supply 120 to the load 118.

Of course any predetermined value may be utilized as a comparison value. These predetermined values correspond to orientations of the apparatus. Some example values from a two-axis MEMS accelerometer are shown in FIGS. 3A-3E. Also, more than one predetermined value may be utilized in the flowchart 400 by adding additional logic blocks as shown in steps 420 and 422. That is, optionally these blocks may be added to monitor additional predetermined conditions in the same flow diagram 400. In one embodiment, this is accomplished as shown in FIG. 4. More specifically, when the comparison step 414 is not satisfied, step 420 is executed rather than proceeding to the return step 416. In step 420, the no motion counter is compared to a second predetermined maximum (max 2). If the no motion counter is greater than max 2 then step 422 is executed. In this comparison step 422, the values of step 404 are compared to determine if they are approximately equal to a second predetermined condition representing a second predetermined orientation and having a second predetermined value. If the values of step 404 are approximately equal to the second predetermined values then step 418 is executed. If the values of step 404 are not approximately equal to the second predetermined values then step 416 is executed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of controlling an apparatus, comprising the steps of:
   a) periodically reading a gravitational value generated by an accelerometer;
   b) comparing the gravitational value with a previous gravitational value;
   c) incrementing a no motion counter when the gravitational value is substantially the same as the previous gravitational value;
   d) resetting the no motion counter to zero when the gravitational value is substantially different from the previous gravitational value;
   e) determining if the no motion counter exceeds a threshold;
   f) if yes in e), determining whether the gravitational value is within a tolerance difference from a reference gravitational value that is indicative of a known dangerous orientation; and
   g) if yes in f), sending a signal to turn off power delivery to a load of the apparatus.

2. The method of claim 1, wherein the tolerance difference is less than a 10 percent difference.

3. The method of claim 1, wherein the apparatus is selected from the group consisting of an electric iron, an electric soldering iron, and an electric heater.

4. The method of claim 1, wherein the apparatus is an electric iron having a toe, a heel, a first side and a second side, and a heating surface and wherein the known dangerous orientation comprises the heating surface of the electric iron being positioned on a support surface.

5. The method of claim 1, wherein the apparatus is an electric iron having a toe, a heel, a first side and a second side, and a heating surface and wherein the known dangerous orientation comprises either the first side or the second side of the electric iron being positioned on a support surface.

6. A protective circuit for an apparatus, comprising:
an accelerometer having an output;
a microcontroller coupled to the output of the accelerometer;
a switch configured to control delivery of power to the apparatus, said switch coupled to an output of the microcontroller; and
a load of the apparatus coupled to a first terminal of the switch, wherein a second terminal of the switch is configured to be coupled to a power source;
wherein the microcontroller is configured to:
   a) receive from the accelerometer a gravitational value;
   b) compare the gravitational value with a previous gravitational value;
   c) increment a no motion counter when the gravitational value is substantially the same as the previous gravitational value;
   d) reset the no motion counter to zero when the gravitational value is substantially different from the previous gravitational value;
   e) determine if the no motion counter exceeds a threshold;
   f) if yes in e), determine whether the gravitational value is within a tolerance difference from a reference gravitational value that is indicative of a known dangerous orientation; and
   g) if yes in f), control the switch to turn off power delivery to the load.

7. The circuit of claim 6, wherein the accelerometer is a two-axis MEMS accelerometer.

8. The circuit of claim 6, wherein the accelerometer is a three-axis MEMS accelerometer.

9. The circuit of claim 6, wherein the tolerance difference is less than a 10 percent difference.

10. The circuit of claim 6, wherein the apparatus is selected from the group consisting of an electric iron, an electric soldering iron, and an electric heater.

11. The circuit of claim 6, wherein the apparatus is an electric iron having a toe, a heel, a first side and a second side, and a heating surface and wherein the known dangerous orientation comprises the heating surface of the electric iron being positioned on a support surface.

12. The circuit of claim 6, wherein the apparatus is an electric iron having a toe, a heel, a first side and a second side, and a heating surface and wherein the known dangerous orientation comprises either the first side or the second side of the electric iron being positioned on a support surface.

* * * * *